July 31, 1962 R. T. SAMPSON 3,047,312

REGISTER CARDS FOR ASSIGNMENT OF ACCOUNT NUMBERS IN SIMULTANEOUS ALPHABETIC-NUMERIC SEQUENCE

Filed March 16, 1960 11 Sheets-Sheet 1

INVENTOR.
RODNEY T. SAMPSON
BY
Frease, Bishop, Johns & Schick
ATTORNEYS

July 31, 1962 R. T. SAMPSON 3,047,312

REGISTER CARDS FOR ASSIGNMENT OF ACCOUNT NUMBERS IN SIMULTANEOUS ALPHABETIC--NUMERIC SEQUENCE

Filed March 16, 1960 11 Sheets-Sheet 2

INVENTOR.

RODNEY T. SAMPSON

BY

Frease, Bishop, Johns & Schick

ATTORNEYS

INVENTOR.
RODNEY T. SAMPSON
BY
Frease, Bishop, Johns & Schick
ATTORNEYS

INVENTOR.
RODNEY T. SAMPSON
BY
Frease, Bishop, Johns & Schick
ATTORNEYS

INVENTOR.
RODNEY T. SAMPSON
BY
Frease, Bishop Johns & Schick
ATTORNEYS

INVENTOR.
RODNEY T. SAMPSON
BY
Frease, Bishop, Johns & Schick
ATTORNEYS

INVENTOR.
RODNEY T. SAMPSON
BY
Frease, Bishop, Johns & Schick
ATTORNEYS

INVENTOR.
RODNEY T. SAMPSON
BY
Frease, Bishop, Johns & Schick
ATTORNEYS

INVENTOR.
RODNEY T. SAMPSON
BY
Frease, Bishop, Johns & Schick
ATTORNEYS

July 31, 1962 R. T. SAMPSON 3,047,312

REGISTER CARDS FOR ASSIGNMENT OF ACCOUNT NUMBERS
IN SIMULTANEOUS ALPHABETIC-NUMERIC SEQUENCE

Filed March 16, 1960 11 Sheets-Sheet 10

INVENTOR.
RODNEY T. SAMPSON
BY
Frease, Bishop, Johns & Schick
ATTORNEYS

INVENTOR.
RODNEY T. SAMPSON
BY
Frease, Bishop, Johns & Schick
ATTORNEYS 3,047,312
Patented July 31, 1962

3,047,312

REGISTER CARDS FOR ASSIGNMENT OF ACCOUNT NUMBERS IN SIMULTANEOUS ALPHABETIC-NUMERIC SEQUENCE

Rodney T. Sampson, Canton, Ohio, assignor to Diebold, Incorporated, Canton, Ohio, a corporation of Ohio Filed Mar. 16, 1960, Ser. No. 15,360
3 Claims. (Cl. 283—36)

Figure 1:
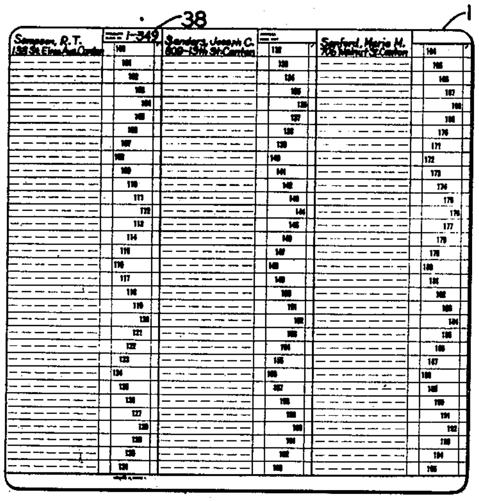
Figure 2:
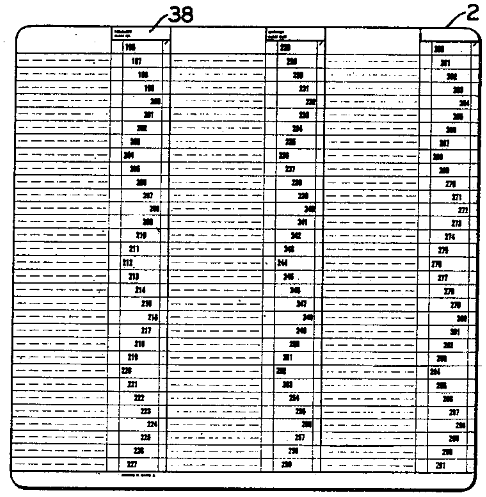
Figure 3:
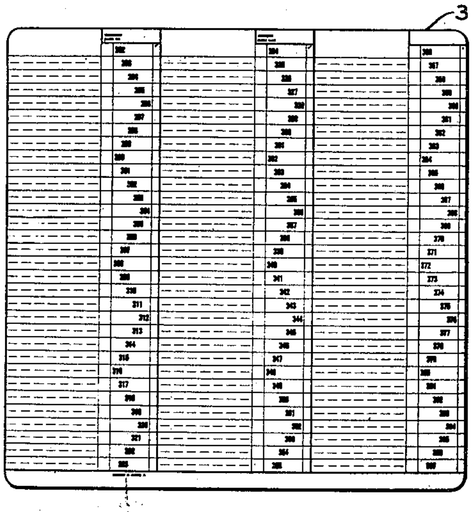
Figure 4:
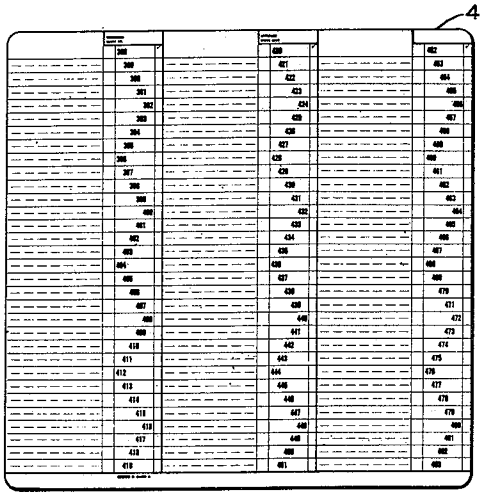
Figure 5:
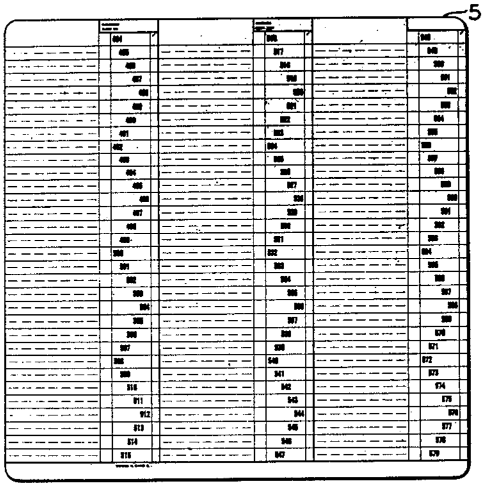
Figure 6:
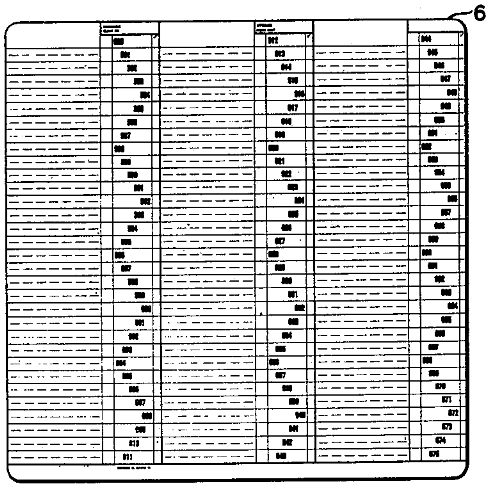
Figure 7:
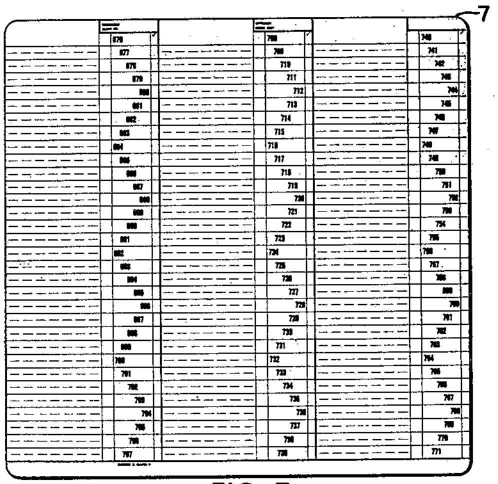
Figure 8:
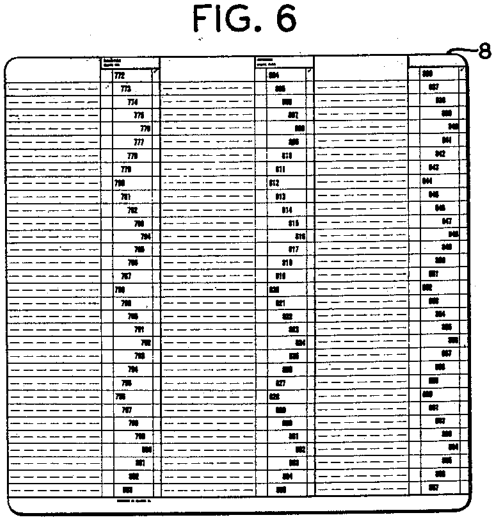
Figure 9:
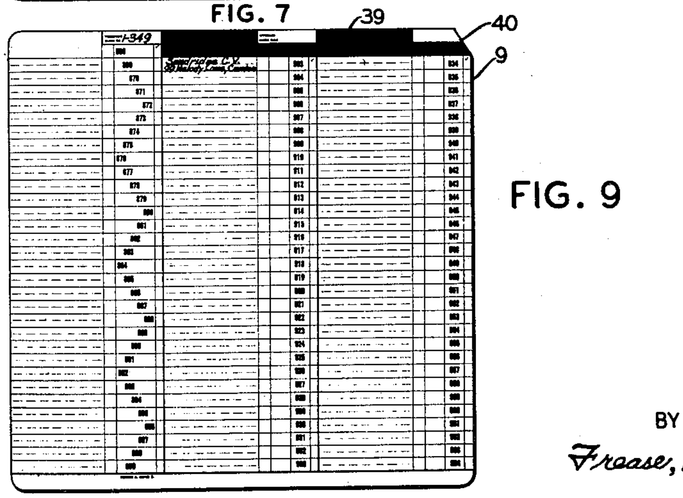
Figure 10:
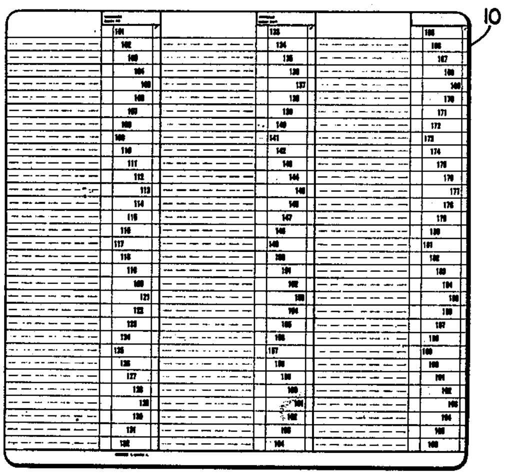
Figure 11:
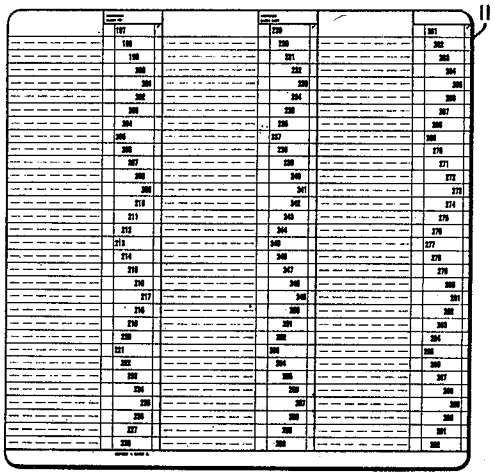
Figure 12:
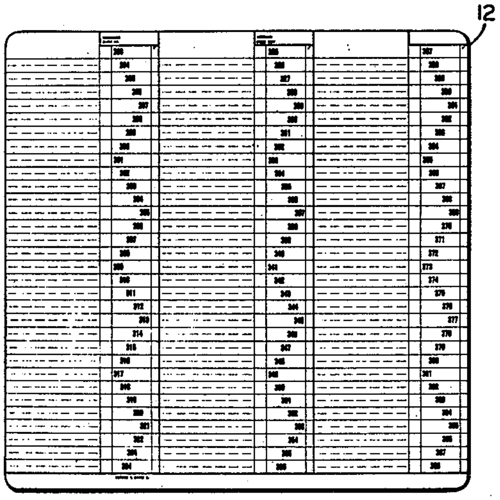
Figure 13:
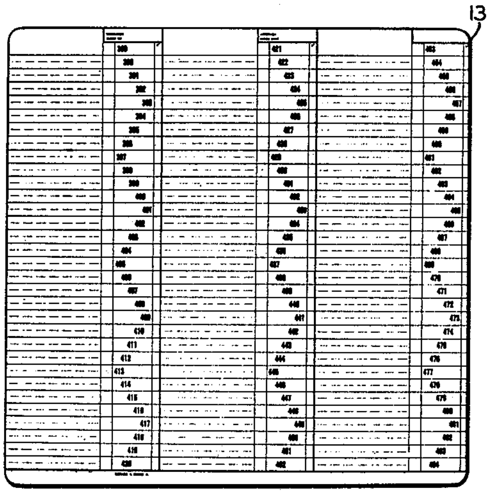
Figure 14:
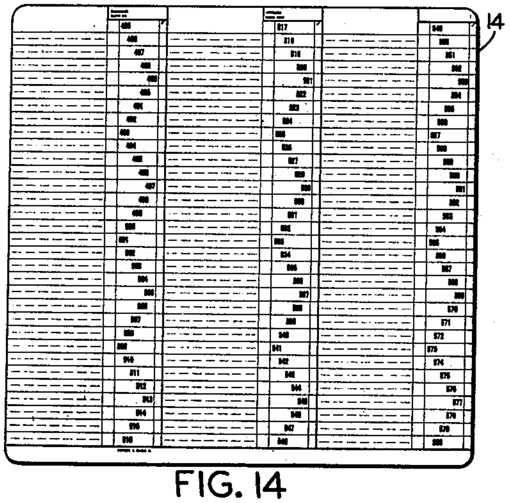
Figure 15:
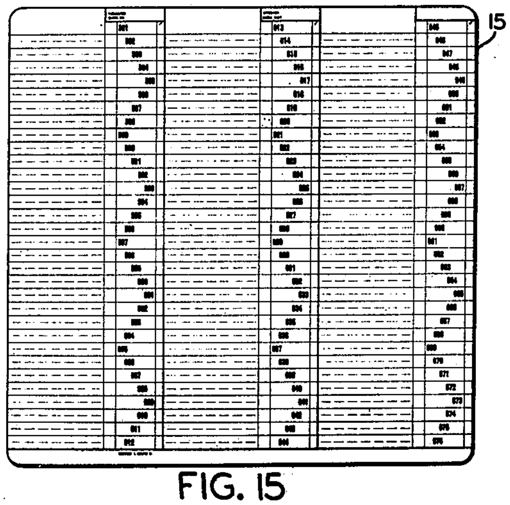
Figure 16:
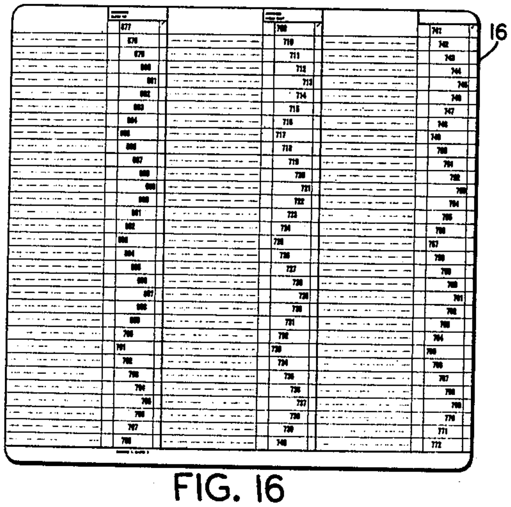
Figure 17:
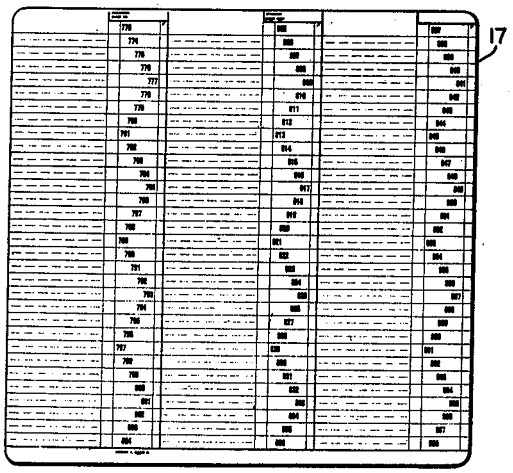
Figure 18:
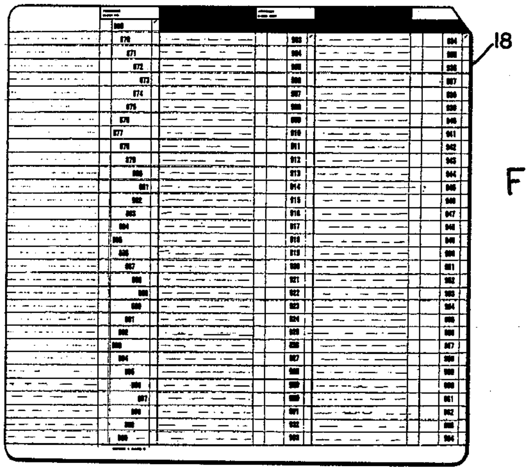
Figure 19:
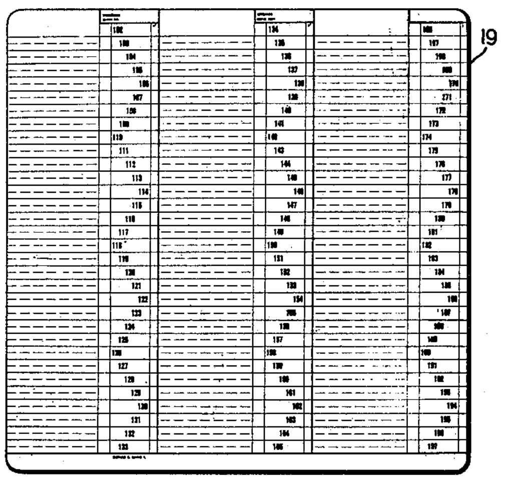
Figure 20:
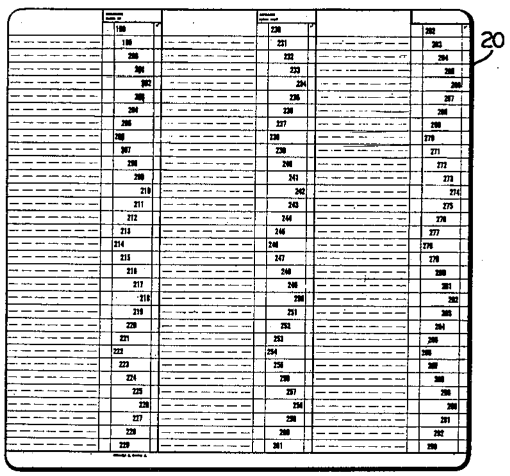
Figure 21:
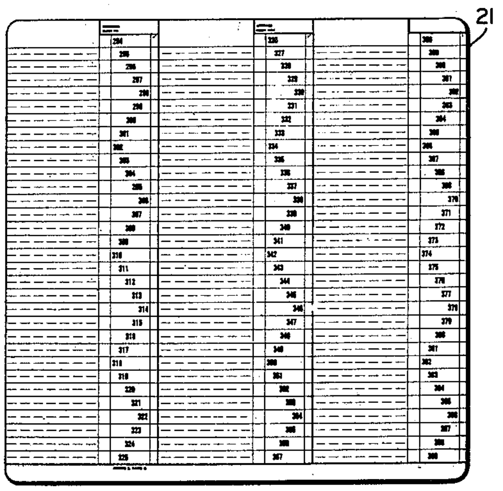
Figure 22:
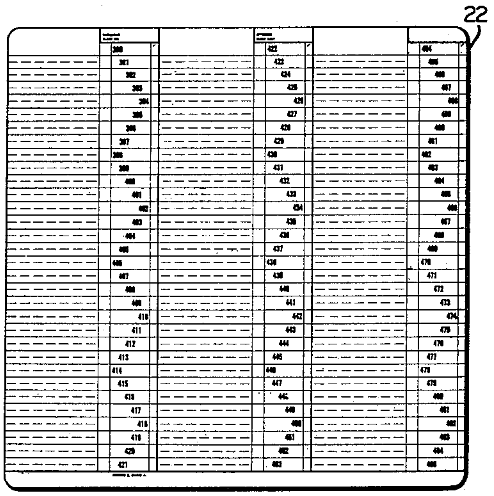
Figure 23:
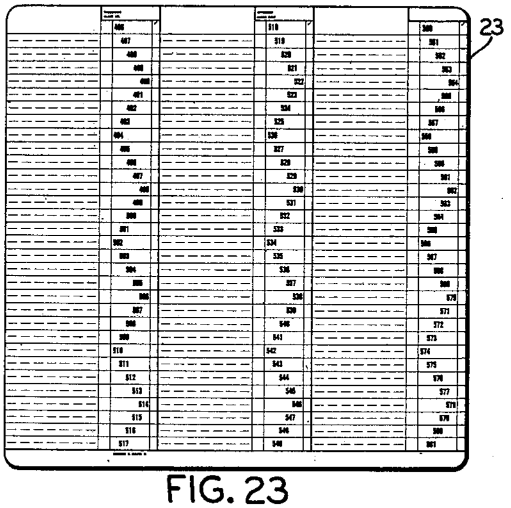
Figure 24:
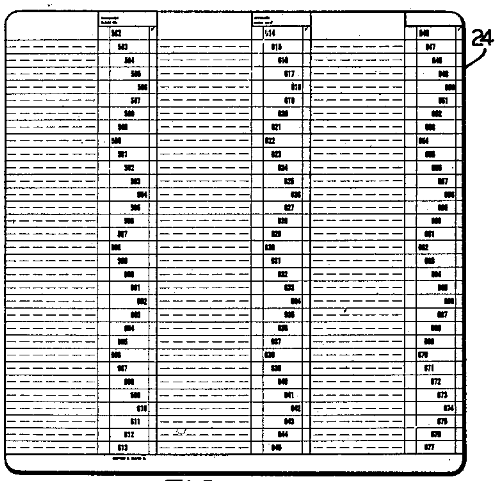
Figure 25:
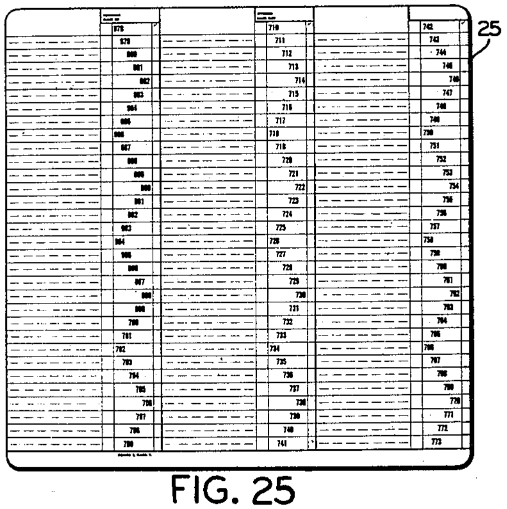
Figure 26:
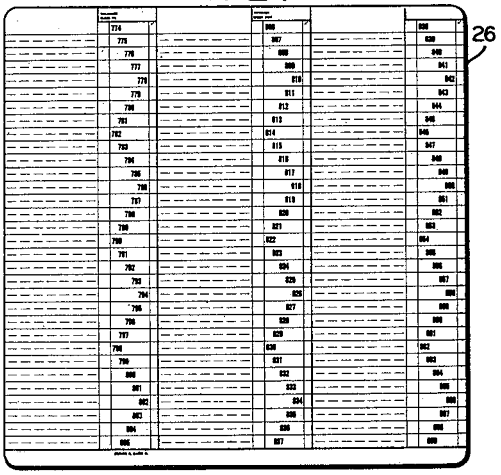
Figure 27:
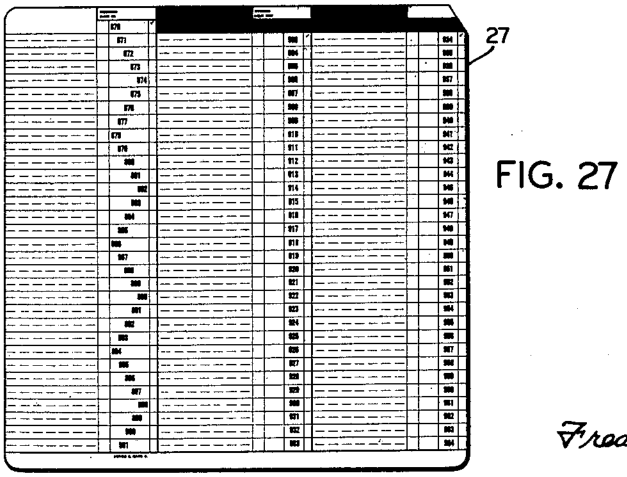
Figure 28:
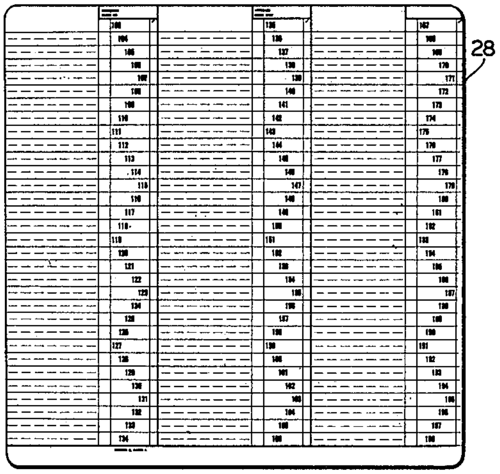
Figure 29:
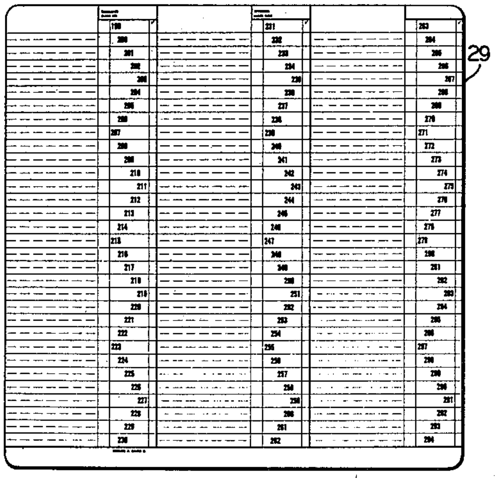
Figure 30:
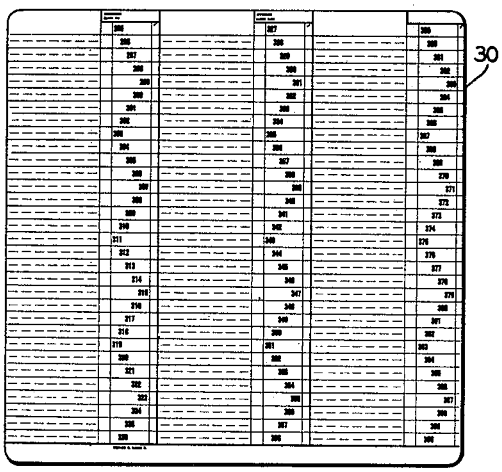
Figure 31:
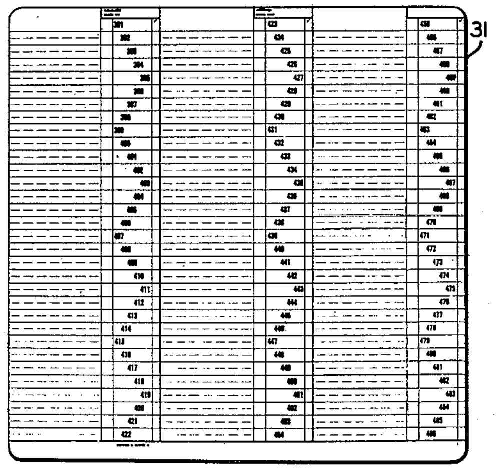
Figure 32:
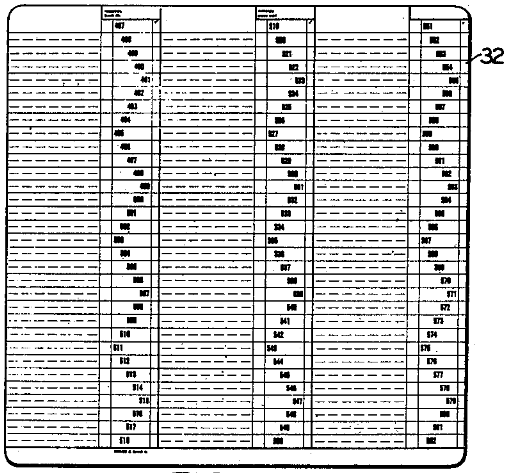
Figure 33:
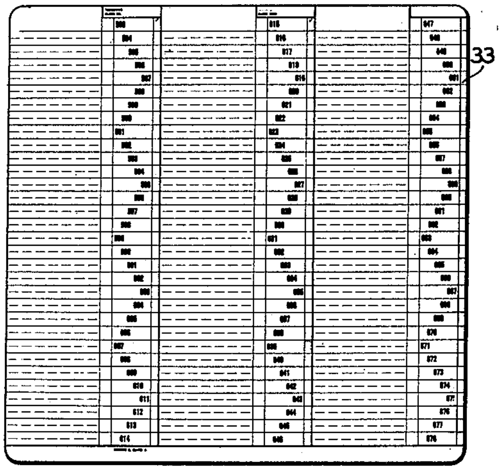
Figure 34:
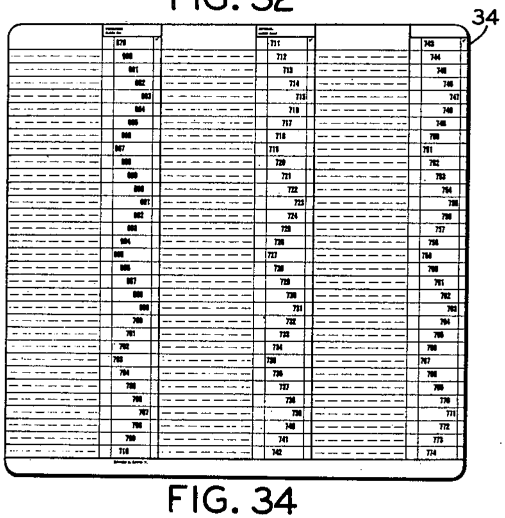
Figure 35:
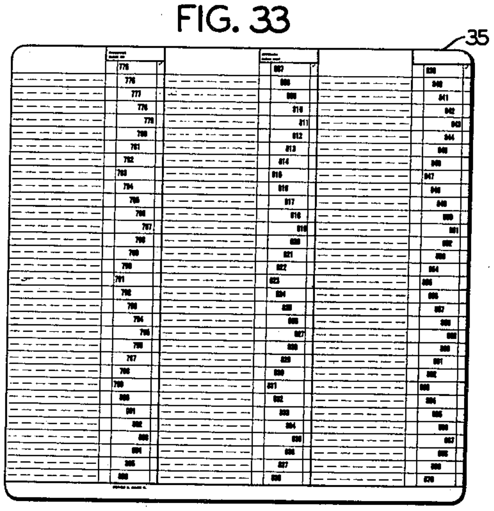

The invention relates to register cards for assignment of account numbers in simultaneous alphabetic-numeric sequence and more particularly to a register card construction comprising a plurality of individually different correlated register cards forming a register card set which may be used with successive similar sets to assign numbers in numeric sequence to accounts, existing or new, arranged in alphabetic sequence, while permitting the subsequent assignment of additional account numbers within the established alphabetic-numeric sequence and while maintaining the sequence both of alphabetic arrangement of the accounts and of the numeric designations assigned to such accounts.

The expanding use of tabulating cards and electronic business and bookkeeping machines requires the assignment of an individual and different designation number to each account of an alphabetically arranged filing installation to be processed. This is necessary in order that any individual account, which cannot be recognized by a tabulating card or an electronic business machine through an alphabetic designation, can be recognized by the individual designation number assigned to the account.

The established alphabetic sequence should be maintained and the account designation numbers also should be arranged in the same sequence in assigning the account numbers.

A problem arises in making provision for future expansion of any such filing installation, i.e., the addition of accounts identified alphabetically, into the established alphabetic sequence with a concurrent assignment of an individually different designation number for the new account, while maintaining simultaneous alphabetic-numeric sequence in the installation of the added account and its identifying number.

Heretofore, in an attempt to achieve the described objectives, the common numeric gap process has been used which involves mathematical calculations and the entry of the calculated number in assigning a new number to a newly added account. Both the calculation and the entry of the calculated number involve possible human error. Further, time is consumed in carrying out each calculation and in making each entry for the assignment of an account number to each account.

In accordance with the invention, the assignment of an account number to each account of an alphabetically arranged filing installation, both originally and as the filing installation expands, is greatly simplified. The assignment of account numbers is accomplished automatically and the assigned account number determined visually. Available unassigned account numbers also may be observed visually. No calculations are necessary to assign a new account number in the established installation. No entry of a calculated number is required.

In describing the invention, for convenience, reference is made to an "account" number which is to be assigned to an alphabetically designated account, the last three digits of the assigned account number being printed on the register cards of the invention. Such account number may contain any number of digits the last three of which are printed on the register cards, and the digits for the high order of the number are applied in full thousands to the cards of each series in a space provided. The "account" number referred to is that which accomplishes the alphabetic-numeric sequence of the account. A number assigned to any particular person or object may, in addition to the "account" number, also include a prefix or suffix for other purposes.

For example, the register cards of the invention may be used by a bank in connection with its filing installation for checking accounts. The bank has operational files, one for each checking account, which are arranged and filed alphabetically. If the bank converts an existing system to electronic bookkeeping an account number is usually assigned to each existing individual checking account. Some means must be used to assign and register the individual account number assigned. This register of assigned and unassigned but available account numbers may be located conveniently at the new accounts department for immediate reference and use in assigning an account number for a new customer and in advising the customer of that number at the time the new checking account is opened.

However, the use of the register card tool or means of the invention is not limited to use with bank checking accounts but the improved register card means may be used to assign and register designation numbers for any series of files or other material normally used in alphabetic sequence, to establish simultaneous alphabetic-numeric sequence for the files or material and the designation numbers assigned thereto. Thus the term "account" as used herein is intended to include not only files for checking accounts but also other types of files or material arranged and normally used or filed in alphabetic sequence. Further, it is intended that the improved register cards may be used not only for assigning account numbers to existing alphabetically arranged material but also for assigning account numbers to material to be alphabetically arranged in setting up a new system or filing installation.

It is the general object of the present invention to provide a new means or tool for assigning and registering the assignment of account numbers to accounts arranged in alphabetic sequence so as to provide simultaneous alphabetic-numeric sequence.

Furthermore, it is an object of the present invention to provide a new means or tool for assigning and registering the assignment of account numbers to accounts so as to provide simultaneous alphabetic-numeric sequence in a filing installation, which permits the future assignment of individual account numbers to additional accounts added to the installation while maintaining simultaneous alphabetic-numeric sequence in the installation as expanded.

Also, it is an object of the present invention to provide a new means or tool for assigning and registering the assignment of account numbers to accounts so as to provide simultaneous alphabetic-numeric sequence in a filing installation, which involves the use of the common numeric gap process without requiring mathematical calculations to be made or a calculated number to be entered.

Furthermore, it is an object of the present invention to provide a new means or tool for assigning and registering the assignment of account numbers to accounts so as to provide simultaneous alphabetic-numeric sequence in a filing installation, which uses the common numeric gap process with a specific gap of an exponential power of 2, such as 16, 32, 64 or 128; and which enables direct and automatic visual identification of the mid-points between any two previously assigned account numbers, without need for calculating a number; measuring a distance or locating and interpreting a symbol, or even reading a number.

Also, it is an object of the present invention to provide a new account number assignment and register means or tool for providing simultaneous alphabetic-numeric sequence in a filing installation, which utilizes the common numeric gap process for the assignment of 800 account numbers utilizing numbers from the sequence of 100 to 902 in a group of 1000 consecutive numbers; which utilizes any portion or all of 97 numbers from 903 to 999 in said group of 1000 numbers for individual assignment to alphabetic designations which exceed the capacity provided by the gaps employed; and which leaves the group of numbers 000 to 099 in said group of 1000 numbers, available for special purposes. The group of such special purpose accounts numbers ending in 000 to 099 is subject to automatic recognition and/or segregation by machine sorting by reason of the zero in the hundreds position which does not occur in any (or all) of the other numbers assigned as regular account numbers.

Moreover, it is an object of the present invention to provide a new account number assignment and register tool or means for providing simultaneous alphabetic-numeric sequence in a filing installation, which assures equal original distribution of the last 2 digits, 00 to 99, of all account numbers originally assigned in establishing simultaneous alphabetic-numeric sequence in a filing installation. The pattern of entry of subsequent accounts entered in the register assures continuation of this pattern of equal distribution of the use of the last two digits 00 to 99 insofar as the law of averages permits.

Moreover, it is an object of the present invention to provide an account number assignment and register tool or means for providing simultaneous alphabetic-numeric sequence in a filing installation, with which account numbers are assigned automatically, without arithmetical calculations of "gaps" at the time of assigning the account number or at any subsequent time, and with the automatic assignment of account numbers being accomplished visually and without physical entry of the assigned account number; thereby eliminating the possibility of human error, reducing the time required for the assignment of an account number, and greatly simplifying the account number assignment procedure.

In addition, it is an object of the present invention to provide a new account number assignment and register card means for establishing simultaneous alphabetic-numeric sequence in a filing installation, which locates the initially assigned account numbers and alphabetic designations or names adjacent the top edge of each card so that the card means may be used as a fast reference register. Entry of names at the time of initial installation on the top lines automatically provides uniform regularity of gap in the assignment of numbers utilized.

Finally, it is an object of the present invention to provide a new means or tool for assigning and registering the assignment of account numbers to accounts so as to provide simultaneous alphabetic-numeric sequence in a filing installation, which register means has relatively unlimited capacity and which is simple, rapid and accurate in use.

These and other objects and advantages apparent to those skilled in the art from the following description and claims, may be obtained, the stated results achieved and the described difficulties overcome by the improvements, combinations, constructions, arrangements, elements and cooperative arrangement of elements, which comprise the present invention, the nature of which is set forth in the following general statement, a preferred embodiment of which—illustrative of the best mode in which applicant has contemplated applying the principles—is set forth in the following description and drawings, and which are particularly and distinctly pointed out and set forth in the appended claims forming part hereof.

The nature of the discoveries and improvements of the present invention may be set forth in general terms as including a set of register cards consisting preferably of four successive series of cards, a plurality of individual register cards in each series with the same number of cards in each series, at least all but one of the cards in each series having a plurality of columns of numbers consecutive in each column printed thereon, there being preferably 32 three digit numbers in each column, there being 25 columns in each series, the numbers in successive columns of said 25 columns being consecutive thereby providing 800 different consecutive three digit numbers, the numbers in each column of said consecutive 800 numbers being located in vertical zig-zag arrangement, the top column numbers of each of said 25 zig-zag number arranged columns being aligned horizontally adjacent the top edges of the cards, the first numbers of said 800 consecutive numbers of each of said four series being consecutive from series to series, there being four numbers in each zig and zag stand of said zig-zag arrangement, before change from zig to zag direction or vice-versa, at least one card in each series having at least one over-flow column of consecutive three digit numbers printed thereon, and the series of numbers in each over-flow column of each series of cards being the same as the series of numbers in all other such over-flow columns.

In the drawings, which illustrate the invention—

Figure 37:
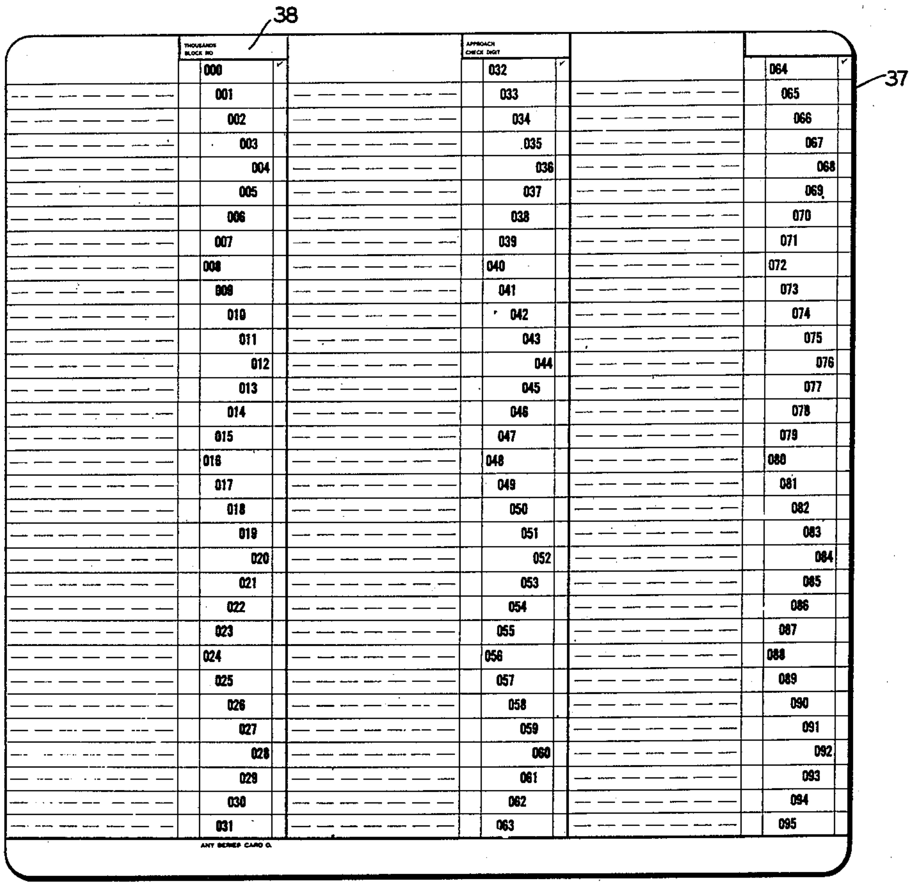
Figure 38:
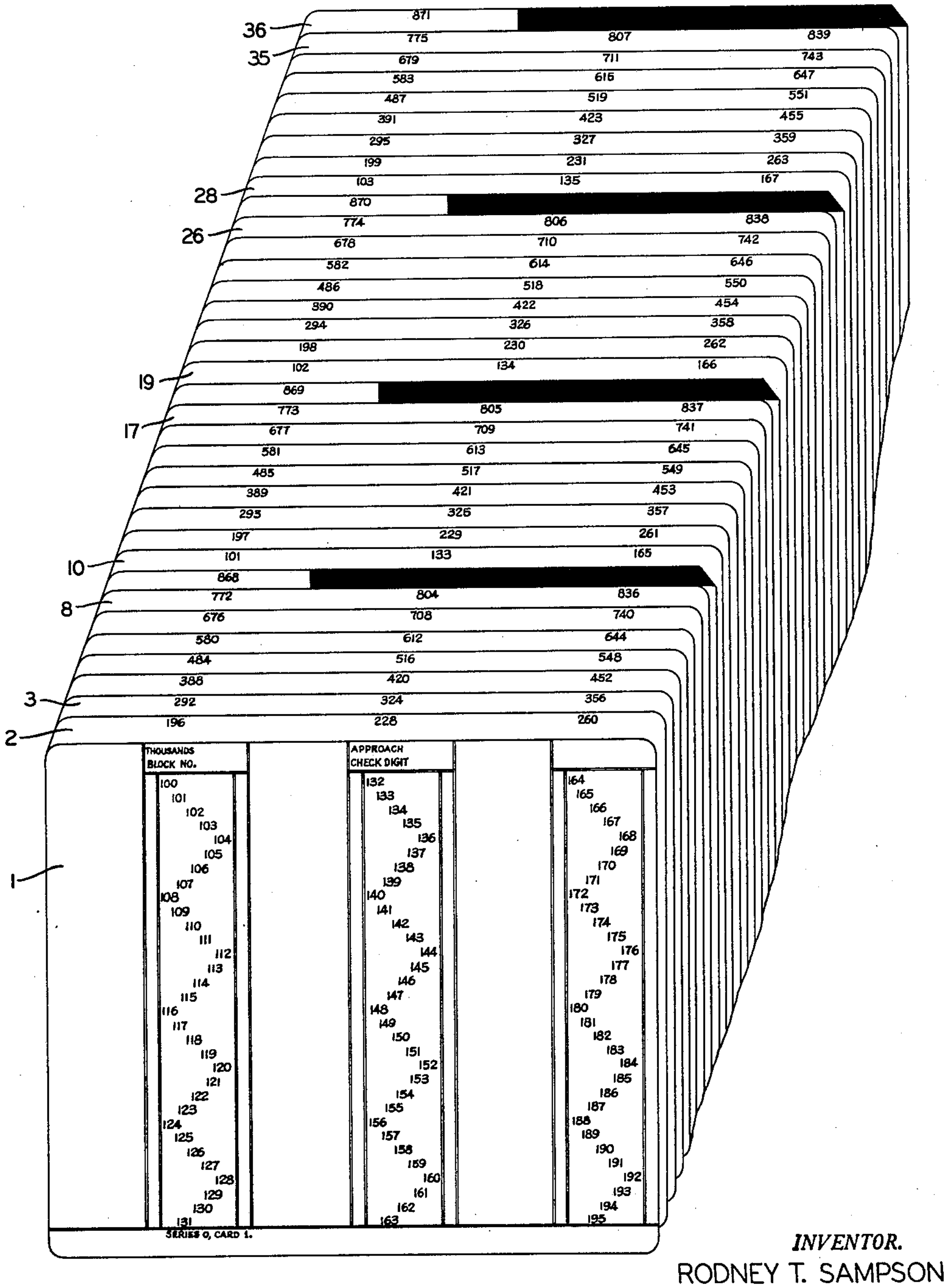
Figure 39:
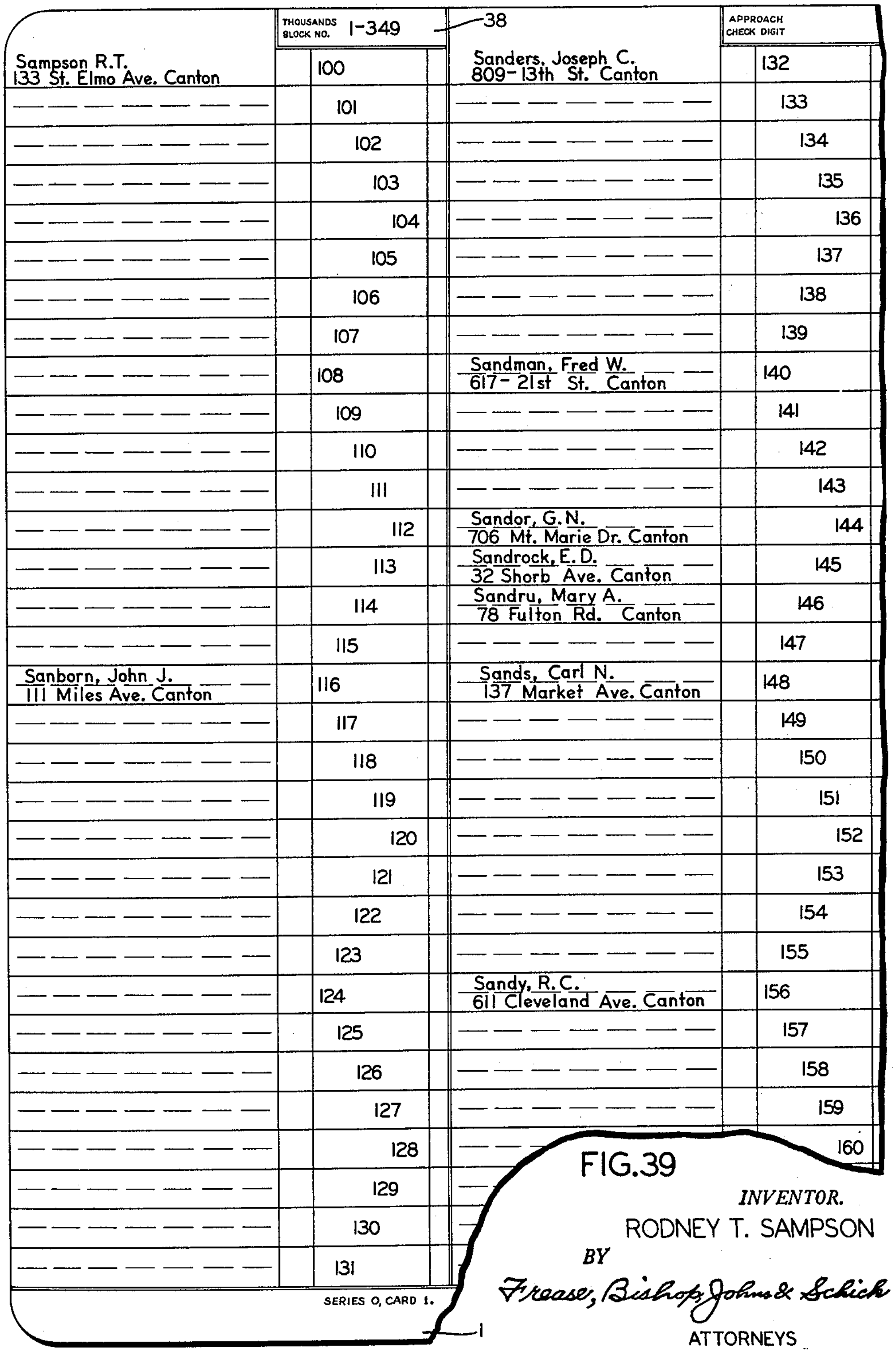

FIGS. 1 through 9 illustrate on a reduced scale nine different individual register cards constituting the first of four successive series of cards which comprise a set of register cards in accordance with the invention;

FIGS. 10 through 18 similarly illustrate the nine different individual register cards in the second series of four successive series of cards constituting a set;

FIGS. 19 through 27 similarly illustrate the nine different individual register cards constituting the third of four successive series of cards comprising the set of register cards;

FIGS. 28 through 36 similarly illustrate the nine different individual register cards constituting the fourth of four successive series of cards comprising a set of register cards;

FIG. 37 is a view on a larger scale of a supplemental special purpose register card which may be used as an adjunct to the set of 36 different cards;

FIG. 38 is a perspective view illustrating somewhat diagrammatically the numbers which appear in the top entry spaces used for original register of names, showing the use of all combinations of the last two digits 00 to 99 in each successive entry of 100 names, of each of the 36 register cards constituting a set in accordance with the invention; and FIG. 39 is a full size view of a portion of the card shown in FIG. 1.

Similar numerals refer to similar parts throughout the various figures of the drawings.

The set of 36 individually different correlated register cards which may be used with successive similar sets, to assign numbers in numeric sequence to accounts and the like arranged in alphabetic sequence in accordance with the invention is illustrated, showing successive individually different cards in FIGS. 1 through 36 inclusive.

This set of cards is also illustrated in FIG. 38. Each of such sets of cards comprises four series of cards, which may be designated "Series 0" cards (FIGS. 1–9), "Series 1" cards, (FIGS. 10–18), "Series 2" cards (FIGS. 19–27), and "Series 3" cards (FIGS. 29–36).

Each of such four series of cards comprises nine individually different cards. The nine "Series 0" cards are indicated by the numerals 1 through 9, the nine "Series 1" cards are indicated by the numerals 10 through 18, the nine "Series 2" cards are indicated by the numerals 19 through 27 and the nine "Series 3" cards are indicated by the numerals 28 through 36. A supplemental special purpose card is designated by the numeral 37 in FIG. 37.

Each card 1 through 37 has a plurality of columns of numbers consecutive in each column printed thereon. There are 32 numbers in each of three columns in each of the cards 1 through 8, 10 through 17, 19 through 26 and 28 through 35. There are 32 numbers in the first or left hand column and 31 numbers in the remaining two columns of each of cards 9, 18, 27 and 36.

In any series of 9 cards, for example cards 1–9 of FIGS. 1 through 9, there are 25 columns each containing 32 numbers, making a total of 800 numbers. These 800 numbers are consecutive in the said 25 columns of numbers on the cards of any series. Each of the numbers are three digit numbers running consecutively, for example, for the "Series 0" cards of FIGS. 1 through 9, from 100 to 899.

Thus, there is a gap of 32 between the numbers at the tops of successive columns in any series, said numbers for example in card 1 of FIGS. 1 and 39, at the tops of successive columns being 100, 132 and 164.

Figure 36:
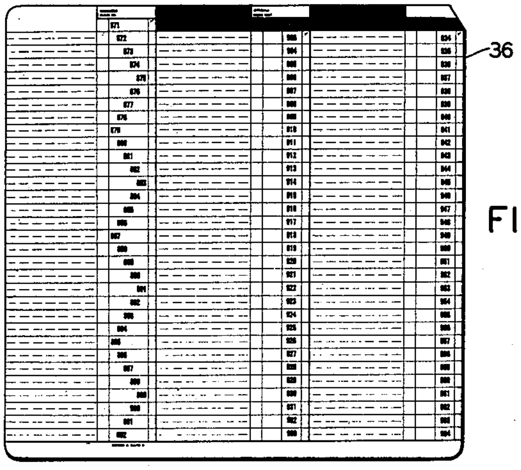

In accordance with the invention, the 800 consecutive three digit numbers in the successive series begin with 100 for the "Series 0" cards (FIGS. 1–9), begin with 101 for the "Series 1" cards (FIGS. 10–18), begin with 102 for the "Series 2" cards (FIGS. 19–27) and begin with 103 for the "Series 3" cards (FIGS. 28–36). Thus, the series of 800 consecutive three digit numbers in the 25 columns of the "Series 3" cards ends with the number 902 (FIG. 36).

Referring particularly to FIG. 38, the set of 36 cards composed of four series of 9 cards each, have 100 columns of numbers consecutive in each series. Thus, there are 100 numbers at the top line of the three columns of the first 8 cards of each series and the left hand column of the 9th card of each series in a set of four series of 9 cards each.

These 100 top line three digit numbers use all combinations of the last two digits 00 to 99. For example, referring to FIG. 38, the number on the top line of the left hand column of card 1 is 100, of card 10 is 101, of card 19 is 102 and of card 28 is 103. Then the number at the top line of the middle column of card 8 is 804, of card 17 is 805, of card 26 is 806 and of card 35 is 807.

In accordance with the invention, the three digit numbers in the columns of cards forming the consecutive 800 numbers (the 3 columns in each of the first 8 cards of each series and the left hand column of the 9th card of each series) are located in vertical zig-zag arrangement in each column as shown. There are four numbers in each zig and zag stand of said zig-zag arrangement, before change from zig to zag direction or vice-versa. For example, referring to FIG. 39, the numbers 101, 102, 103 and 104 are arranged in a zig direction and then the numbers 105, 106, 107 and 108 are arranged in a zag direction with reference to the 104.

In this manner, the numeric mid-point between any two numbers in any column is instantly and directly visually apparent without calculation, being indicated by the zig-zag arrangement or by the four numbers in each zig and zag stand before change from zig to zag direction or vice-versa. Thus, the mid-point number between the numbers 100 and 132 on card 1 in FIG. 39 is 116 which is instantly visible by the arrow-like or pointed-like arrangement of the zig-zag arranged numbers. Further it is instantly located without necessary recognition of the numeric value of the number. The numeric mid-point between the numbers 100 and 116 is 108. The numeric mid-point between the numbers 108 and 116 is 112. The numeric mid-point between the numbers 108 and 112 is 110, the middle of three lines between previous entries. The numeric mid-point between the numbers 108 and 110 is 109, the only available line between previous entries. All these numeric mid-points may be instantly located in the manner stated without calculation or recognition.

The top column numbers for the 25 zig-zag number arranged columns of each series are aligned horizontally adjacent the top edges of the cards. Thus, in card 1 of FIGS. 1, 38 and 39, the numbers 100, 132 and 164 are aligned horizontally with respect to each other.

In the two right hand columns of the 9th card of each series—cards 9, 18, 27 and 36—and each of which contain 31 numbers, the numbers are not arranged in zig-zag fashion but have a vertical column arrangement. The numbers in the two columns of vertical column arranged numbers of each card 9, 18, 27 and 36 are consecutive, in each instance running from 903 to 964, and are the same for all cards 9, 18, 27 and 36.

The supplemental special purpose card 37 shown in FIG. 37 may or may not be used along with a set of 36 cards comprising four series of cards with 9 cards in each series. The numbers printed on the card 37 also have a zig-zag arrangement in each of the 3 columns running consecutively from the number 000 to 095. Thus, each of these numbers begins with a 0 and utilizes in the three columns the last two digits 00 to 95.

Preferably in use each series of cards is printed on a different color of paper or card stock such as buff for the "Series 0" cards, salmon for the "Series 1" cards, green for the "Series 2" cards and white for the "Series 3" cards. Special purpose cards 37 may be printed on blue stock.

Each series represents a "thousand" block of numbers and each series starts with a different number (100 on card 1, 101 on card 10, 102 on card 19, and 103 on card 28). As indicated at 38 a space is provided at the top of the left hand column of each card, in which the notation "Thousands Block No." is printed. Any "Thousands Block No." will pertain to all cards of a series and will be entered on each card of a series at the time of installation or use of the cards and will constitute the thousands portion of an account number which will also contain as its last three digits, one of the numbers printed in any of the columns. These last three digits of all numbers to be used, are printed on the cards in the zig-zag pattern stated to visually reveal the exact mid-point between any two previously assigned numbers, which is the correct place to enter a new name.

The installation of an alpha-numeric sequence system in accordance with the invention in connection with alphabetically arranged material requires account numbers to be assigned to such material in simultaneous numeric sequence and involves operations next to be described.

The alphabetically arranged material, which may be a series of names arranged in alphabetic sequence, is entered one name at a time on the top lines of the columns of successive sets of cards. The entry of any name may, if desired, be accompanied by entry of an address, sufficient space therefor being provided. In initially starting the entry of account names on the top lines of the cards with names beginning with the letter "A" of the alphabet, the first name is entered at the top of the second column of the first card, leaving the top of the first column blank, which represents "absolute" A.

Whenever the alphabet letters change from A to B or B to C etc. as successive account names are entered on the top lines of successive cards in a set and successive sets, a new series will be started for each new letter and the top line of one column will be left blank to represent "absolute" B, C, etc. Also, a "Thousands Block No." is entered in the space 38 of each card, this number changing by one in the last digit of the "Thousands Block No." for each series of cards. Thus, the 25 columns in any series will receive 25 names during the initial entry of the account names on the top lines of the cards when a gap size of 32 is employed (excepting for spaces left for "absolute" letters).

In thus entering the names on the top line of each card at the tops of the columns, the account numbers which are printed on the cards are automatically assigned and the numeric gap is automatically maintained without calculation of the account numbers or individual entry of the account numbers.

Referring particularly to FIG. 39 and card 1 illustrated therein, the name R. T. Sampson may have been entered at the top of the left hand column and the name Joseph C. Sanders may have been entered at the top of the middle column of the card. Also, Marie M. Sanford may have been the name entered initially at the top of the right hand column of card 1 as shown in FIG. 1. Furthermore, the "Thousands Block No." assigned to the particular series of 9 cards may be 1-349 as shown.

The account number thus assigned to R. T. Sampson is 1-349-100; the account number assigned to Joseph C. Sanders is 1-349-132; and the account number assigned to Marie M. Sanford is 1-349-164.

At some future time it may be desired to assign an account number to John J. Sanborn, which is alphabetically located between Sampson and Sanders. This new account should be assigned an account number midway between the Sampson and Sanders account numbers. The numeric mid-point between the numbers 100 and 132 where the Sanborn account number is to be assigned is instantly recognized by the zig-zag arrangement at the space where the printed number 116 is located; and the Sanborn name is entered at this space and is thus automatically assigned the 1-349-116 account number without calculation and at the same time maintaining the desired gaps.

The next name to be assigned an account number may be Carl N. Sands to which the account number ending in 148 may be instantly located and assigned midway between Sanders and Sanford.

The next name to be assigned an account number may be R. C. Sandy whose assigned number will end in 156 midway between the Sands and Sanford account numbers.

The next name to be assigned an account number may be Fred W. Sandman, the location of which is instantly recognized midway between Sanders and Sands, with a number ending in 140.

The next name to be assigned an account number may be G. N. Sandor whose account number assignment falls midway between Sandman and Sands with a number ending in 144.

The next name may be Mary A. Sandru who may automatically be assigned an account number ending in 146 midway between Sandor and Sands, the middle of three empty lines between previous entries.

The next name to be entered then may be E. D. Sandrock which falls between Sandor and Sandru with the account number ending in 145, which is the only available line between previous entries.

This time, no more spaces or numbers are available at the proper alphabetic point on the register between Sandor and Sandru. When an account requires an assignment of a number where no number is available this is taken care of in the two columns of the 9th card of any series which has the same "Thousands Block No." and which is located within a few cards of the card in any series where no number is available.

Thus, C. V. Sandridge requires assignment of an account number and no space is available between Sandor and Sandrock. The name Sandridge is then entered at the top of the middle column of card 9 in the series with an account number of 1-349-903. When the last three digits of the account number are "903" or greater it signals the fact that it is an overflow account number. Entry of "overflow" names is just as orderly and routine as any other entry and there is space for such entries preprinted on the last or 9th card of each thousands series. Overflow accounts for the cards of any series are assigned in numeric sequence to the prelisted numbers 903 to 964 in the 9th card of any series. Location of and access to this 9th card of any series may be readily accomplished by recognition of the top color band 39 on such cards or by a diagonally cut corner 40 which may characterize the cards 9, 18, 27 and 36.

The probability of overflow accounts will be relatively few. In the operational files where each of the accounts is kept, numeric sequence is maintained but alphabetic access to all accounts is direct. If the account is not found in alphabetic order, it will be found in the 900's group of the same thousands series immediately behind its normal location.

Thus, the operational files will be maintained in true numeric sequence even with overflow accounts, accompanied by simultaneous alphabetic sequence excepting when an overflow account is involved which is instantly recognized when making alphabetic access without the account number by the absence of the account at the proper alphabetic location. At this time it will be known that the account is an overflow account and located among the 900's of the immediate thousands series.

Thus, when making numeric access to the operational file the account is located directly by its sequential numeric position. When making alphabetic access, because the account number is unknown, the account is located directly by its sequential alphabetic position. If when making alphabetic access, because the account number is unknown, the account is not found at its sequential alphabetic location, it will be found among the 900's of the same 1000's series.

The new register cards of the invention thus provide for number assignment without searching for symbols or computing gaps. In order to assign account numbers in simultaneous alphabetic-numeric sequence, utilizing the register cards of the invention, no change in the alphabetically arranged operational file is necessary, that is, the numeric sequence of numbers assigned to the account by installation of the system will keep the accounts in alphabetic sequence. That is to say, numeric sequence and simultaneous alphabetic access in the operational file is maintained and there is room for growth without loss of alphabetic access.

The zig-zag pattern of preprinted account numbers visually locates the numeric mid-point between two previous accounts. Whenever an account number is assigned it is a name assigned to a number not a number to a name; and no calculation or entry of a number is involved.

An important aspect of the invention is the use of consecutive first numbers for the first numbers of each group of 800 consecutive numbers of each of the four series of 25 zig-zag columns each. This feature is indicated by the first number 100 for the "Series 0" cards, the first number 101 for the "Series 1" cards, the first number 102 for the "Series 2" cards, and the first number 103 for the "Series 3" cards, as shown in FIGS. 1, 10, 19, 28 and 38. The use of this successive pattern of numbers evenly distributes the last two digits from 00 to 99 throughout the account numbers originally assigned. Such even distribution of the use of these last two digits 00 to 99 improves the accuracy of keyboard account verification when posting with electronic-mechanical machines, and increases the efficiency of media distribution when machine-sorted.

The use of the special purpose card of FIG. 37 is optional. In the given example of use of the register cards for assigning account numbers in simultaneous alphabetic-numeric sequence to the filing installation for bank checking accounts, it may be desirable to reserve certain account numbers for high activity checking accounts, usually commercial as distinguished from individual checking accounts.

The card 37 may be used for this purpose and inserted at the beginning of any series of nine cards utilizing the same "Thousands Block No." Since all these accounts will have a zero in the hundreds position they can be instantly recognized and material therefore segregated at an early stage of sorting for operational files. Original entries on the cards 37 may be made in gaps of 8 or 16 instead of 32 because of the relatively few accounts of this character involved.

Although the description and drawings describe and illustrate cards used for assignment of numbers in alphabetic-numeric sequence using a gap of 32, the same cards may be used with other gaps of an exponential power of 2 such as 16, 64 or 128. When a gap of 16 is used, the original assignment of numbers will use the top line on each card as well as the middle line on each card where in card 1 the numbers 116, 148 and 180 are present.

When a gap of 64 is used, the original installation will enter the names on the top line of every other column of the zig-zag columns. When a gap of 128 is used the original entries will occur at the top of every fourth zig-zag column.

Accordingly, the improved register cards of the invention provide for the assignment of account numbers in simultaneous alphabetic-numeric sequence, which may be carried out rapidly, accurately and easily; in which the assignment of account numbers is automatic without calculation of a mid-point number; in connection with which accounts in operational files are not disturbed when the alphabetic-numeric sequence is established and registered; in connection with which the operational files are in true numeric sequence simultaneous with alphabetic access; in connection with which additional account numbers may be assigned while maintaining simultaneous alphabetic-numeric sequence or access; which conforms completely with machine requirements for both manual and electronic media and account processing; and solves problems longtime existing in the art.

In the foregoing description, certain terms have been used for brevity, clearness and understanding, but no unnecessary limitations are to be implied therefrom beyond the requirements of the prior art; because such words are used for descriptive purposes herein and not for the purpose of limitation and are intended to be broadly construed.

Moreover, the invention is not limited to the exact structures and arrangements illustrated because the particular cards as to size, etc. may be varied to provide other structural embodiments without departing from the scope of the present invention.

Having now described the features, discoveries and principles of the invention, the construction, operation, use and installation of the improved register cards, and the advantageous, new and useful results obtained thereby; the new and useful systems, devices, combinations, constructions, arrangements, elements, and cooperative arrangement of elements, and mechanical equivalents obvious to those skilled in the art, are set forth in the appended claims.

I claim:

1. Register card construction for the assignment and register of account numbers to names in simultaneous alphabetic-numeric sequence including a set of register cards, the set consisting of four successive series of cards, a plurality of individual cards in each series, each card having top, bottom, left and right side edges, each series of cards having 25 successive number columns printed thereon, there being 32 three-digit numbers in each column, the last two digits of the numbers in the number columns ranging between 00 and 99, the numbers in each column being consecutive and the numbers in the 25 successive number columns being consecutive, thereby providing 800 consecutive three-digit numbers in each series and 4 series of 800 consecutive numbers in each set; the first numbers of said 800 consecutive numbers being consecutive from series to series whereby an even distribution of the last two digits from 00 to 99 throughout the three-digit numbers is obtained; said columns being horizontally spaced from each other and from one side edge of each card, the first column being spaced from the left side edge of the card and the last column being located adjacent the right side edge of the card, the spacing of the number columns forming a name-space column adjacent to each number column, there being a name-space in each name-space column adjacent to each three-digit number in the adjacent number column.

2. The construction defined in claim 1 wherein, in addition to the 25 successive number columns, each series of cards contains at least one overflow column, the numbers of which are in vertical straight line relationship and are sequential in the range from 903 through 999.

3. The construction defined in claim 1 wherein the numbers in each number column of said consecutive 800 numbers are located in zig-zag arrangement, each column having an even number of zig-zag portions of equal size.

References Cited in the file of this patent

UNITED STATES PATENTS

| | | |
|---|---|---|
| 1,070,566 | Wigginton | Aug. 19, 1913 |
| 1,153,761 | Carrill | Sept. 14, 1915 |
| 1,490,547 | Wagner | Apr. 15, 1924 |